Figure 1:
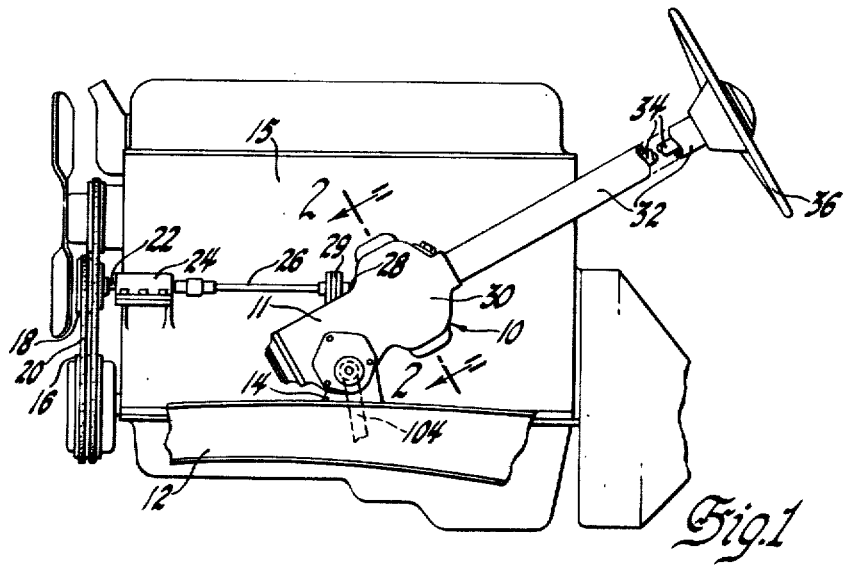

Aug. 13, 1957

C. W. LINCOLN ET AL 2,802,371

MECHANICAL FOLLOW-UP MECHANISM

Filed Aug. 14, 1953

4 Sheets-Sheet 1

INVENTORS
Ralph A. Malone,
Clovis W. Lincoln, &
Paul V. Wyzong Jr.
BY
ATTORNEY

INVENTORS
Ralph O. Malone,
Clovis W. Lincoln &
Paul V. Wysong Jr.
BY
C. H. Dibble
ATTORNEY United States Patent Office 2,802,371
Patented Aug. 13, 1957

2,802,371
MECHANICAL FOLLOW-UP MECHANISM

Clovis W. Lincoln and Paul V. Wysong, Jr., Saginaw, and Ralph A. Malone, Chesaning, Mich., assignors to General Motors Corporation, Detroit, Mich., a corporation of Delaware Application August 14, 1953, Serial No. 374,344

9 Claims. (Cl. 74—388)

This invention concerns a mechanical follow-up mechanism of novel construction and operation. While the mechanism possesses other utility, it is considered especially valuable as applied to the power steering of a motor vehicle and it consequently will be particularly described in that connection.

The power steering of trucks, buses, and heavy off-the-road vehicles has been practiced for some time; indeed in many cases, due to high front end loadings, oversize tires, etc., it is almost essential that the vehicle be so steered, the force required to turn the dirigible wheels, at least when the vehicle is stationary or traveling at low speed, exceeding the strength of many individuals. Recently, power steering has been adopted for use in passenger cars and the innovation has been met with widespread acceptance, not only because it reduces steering effect, but because in most cases it provides a safety factor, substantially eliminating steering wheel fight or loss of wheel control from tire blow-outs, road bumps and ruts, etc.

In the instance of the smaller cars, particularly, the additional cost of the auxiliary apparatus, especially when taken in relation to the over-all cost of the car, has been considered objectionable in many quarters. This objection stems from the fact that the apparatuses presently available are hydraulically operated. Thus, each necessarily includes four fundamental and fairly expensive components; namely, a reservoir for the fluid medium, a pump drawing from the reservoir, a power cylinder operatively linked to the steering elements, and a valve controlling the flow between the pump and power cylinder. In addition, various fixtures and auxiliary valves are required, not to mention the necessary high pressure connecting lines. The specified major parts, and especially the pump and valve, must be manufactured to very close tolerances for successful opertion, and this, of course, contributes to the cost of the apparatus.

While a number of mechanical power steering gears have been heretofore proposed and while these gears are somewhat less costly than the present-day hydraulic gears, they suffer from a number of disadvantages which have precluded their general adoption. A major disadvantage common to all is extreme noisiness in operation—a fault which is manifestly fatal as to passenger cars.

A principal object of this invention is to provide a mechanical power steering gear having a noise level sufficiently low to enable its application to passenger cars.

Another object is to provide a mechanical gear which is positive in operation, comprises a minimum number of inexpensive parts and is readily assembled and installed.

A further object is to supply a mechanical gear, characterized in operation in that the power exerted at the rim of the steering wheel is proportional to the road resistance encountered.

A still further object is to provide a mechanical gear of the type and for the purpose indicated having operating characteristics such that the driver of the vehicle retains a "steering feel."

Still another specific object is to supply a mechanical unit which allows for ordinary manual steering of the vehicle on failure of the source of power.

Figure 2:
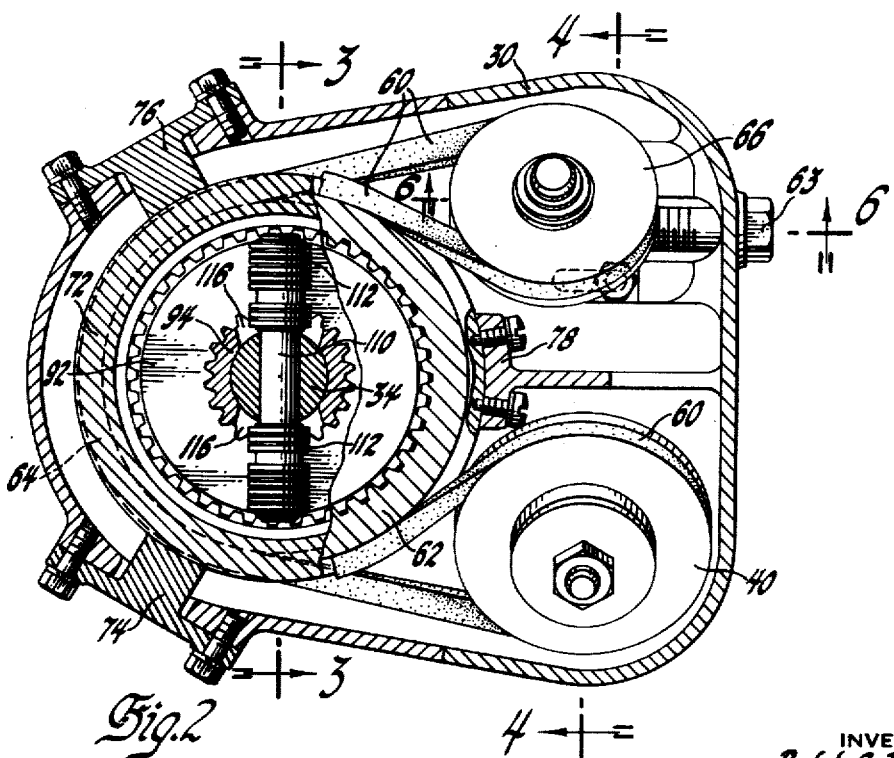
Figure 3:
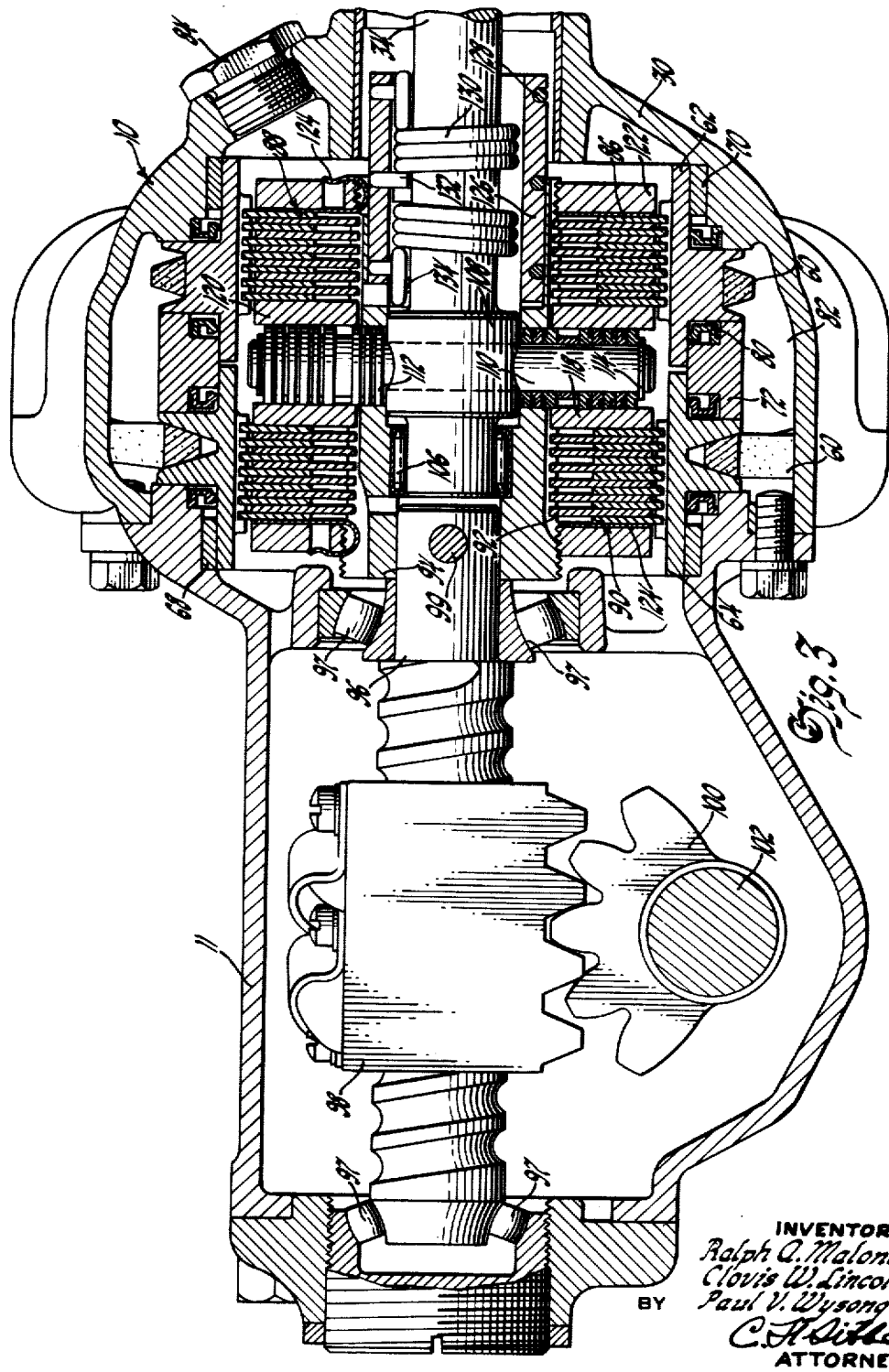
Figure 4:
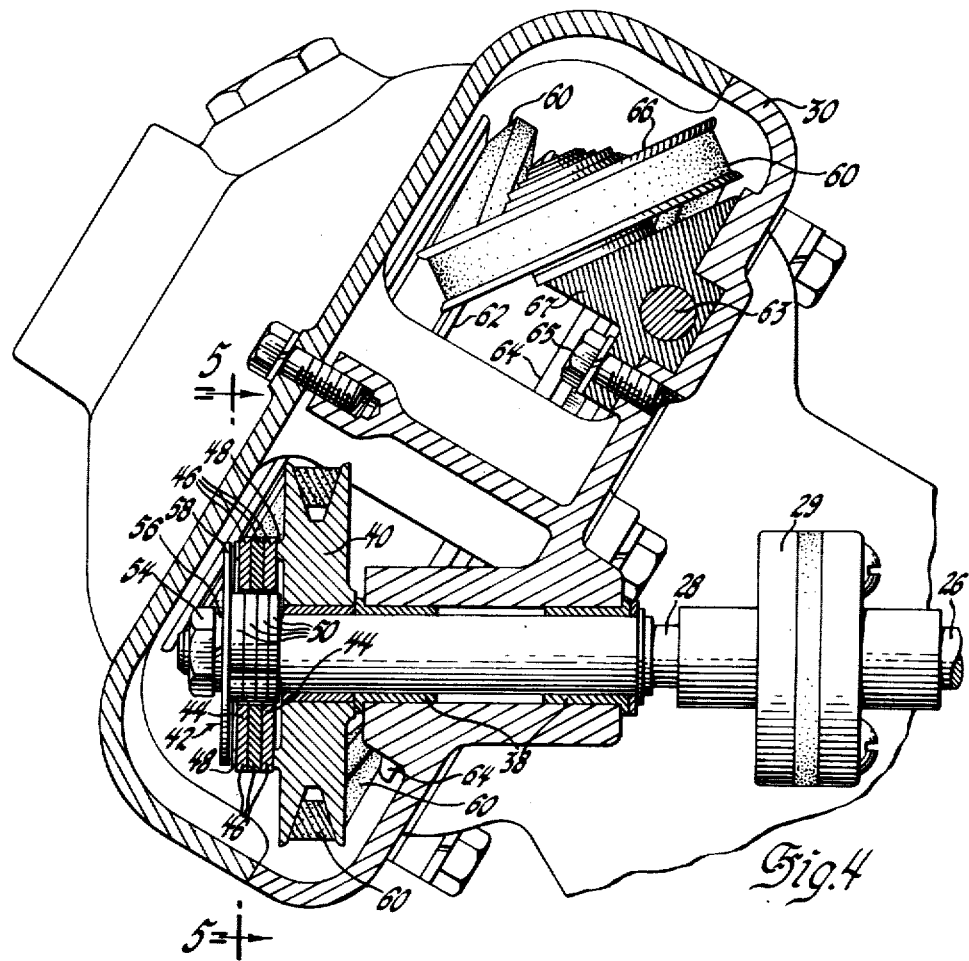
Figure 5:
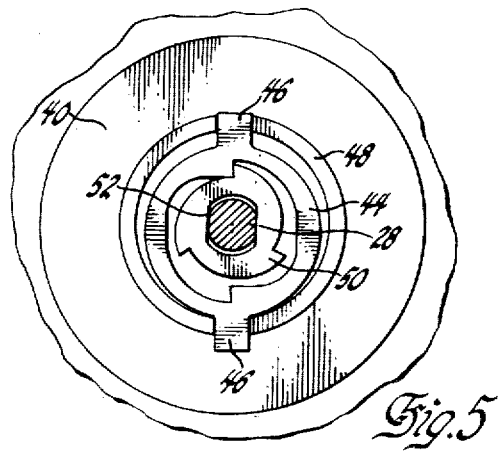
Figure 6:
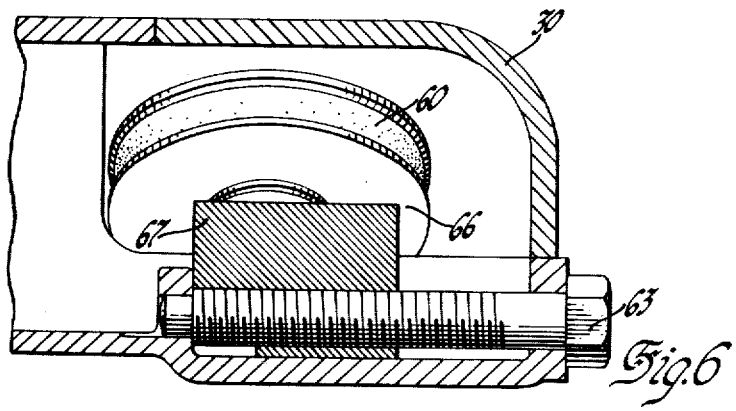
Figure 7:
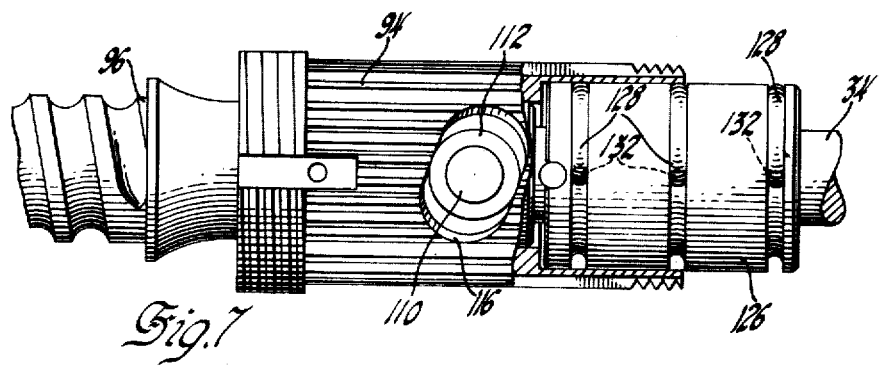
Figure 8:
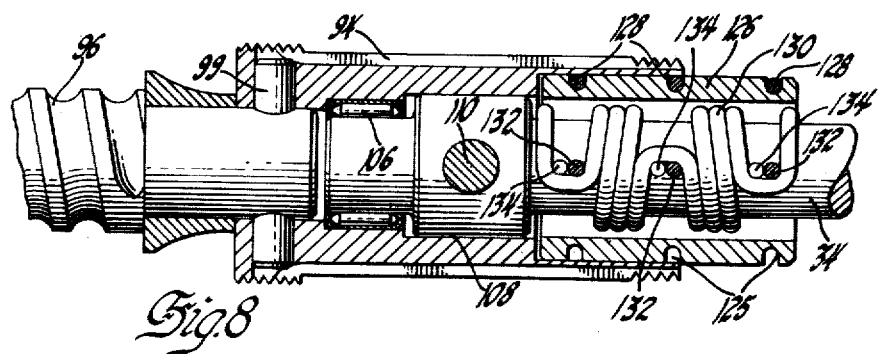

Additional objects and features of the invention will appear from the following specific description which will proceed with references to the accompanying drawings illustrating a preferred embodiment of the invention and in which:

Figure 1 shows the particular gear as preferably applied;
Figure 2 is an enlarged transverse section on the line 2—2 of Figure 1;
Figure 3 is an enlarged longitudinal section on the line 3—3 of Figure 2;
Figure 4 is a section on the line 4—4 of Figure 2;
Figure 5 is a view taken on the line 5—5 of Figure 4;
Figure 6 is a section on the line 6—6 of Figure 4; and
Figures 7 and 8 are details of certain parts appearing in the principal figures.

Referring first to Figure 1, the power steering unit, generally denoted by the numeral 10, is supported with the gear box 11 from the frame 12 of the vehicle by a bracket mounting 14. The unit is powered from the crankshaft of the engine 15 by means including a belt 20 interconnecting pulleys 16 and 18, pulley 16 being shown disposed adjacent and forward of the lower fan belt pulley. Pulley 18 is fast on a shaft section 22 which extends through a bracket mounting 24 to connect with a jack shaft 26, in turn coupled at 29 to a shaft section 28 terminating within the casing 30. The latter has secured thereto the mast jacket or housing 32 for the steering shaft 34, rotatable by the usual steering wheel 36.

Within the casing 30, shaft section 28, which turns in bushings 38 (Figure 4) carries a drive pulley 40 rotated by the shaft through a ratchet type free wheel device or over-running clutch, generally indicated by the numeral 42. Such device comprises (Figure 5) a plurality of external ratchet rings 44, three in the particular embodiment, each having projections 46 received in slots formed in an annular boss 48 integral with the pulley 40 and a plurality of internal pawls 50, four in the particular embodiment, made fast to the shaft 28 by the flattening (52) of such shaft, which to the left of the pulley 40 (Figure 4) is of substantially reduced diameter. A nut 54 threaded on the end of the reduced portion of the shaft, together with the shoulder resulting from the reduction in the diameter of the shaft, precludes lateral displacement of the pawls 50. A split lock washer 56 and a thrust plate 58 are disposed mediate the nut and the outermost pawl. That portion of the shaft on which the nut is threaded is, of course, circular in section and has a diameter approximating the minimum diameter of the flattened portion 52 of the shaft. With the arrangement as described and illustrated, it is believed obvious that the pulley 40 can be rotated by the shaft 28 only in one direction; i. e. counter-clockwise (Figure 5).

An endless belt 60 having the form of a truncated V in cross section, in the embodiment shown, transmits the power applied to the drive pulley 40 to two clutch pulleys 62, 64, the belt also being looped about an idler pulley 66, disposed between the clutch pulleys as the same appear in Figure 4. Considering such figure, it should be apparent that the counter-clockwise rotation of the drive pulley 40 causes clockwise rotation of clutch pulley 62 and counter-clockwise rotation of the idler pulley 66 and clutch pulley 64. To allow for adjustment of the belt tension, idler pulley 66 is mounted on a shiftable block 67 held in the selected position by bolts 63 and 65.

Referring now particularly to Figure 3, it will be seen that the clutch pulleys 62, 64 rotate in bushing rings 70, 68, respectively, and in a common bushing ring 72, held within the casing 30 by the spider elements 74, 76, 78 (Figure 2). Oil seals 80 prevent the entry of oil into the annular compartment 82 and thus preclude the belt slippage which might otherwise occur. As indicated, the gear box 11 and the casing 30, except for such compartment, are normally maintained filled with oil to a suitable level, the oil being introduced as an assembly operation, or subsequently, via the opening receiving the threaded plug 84.

The clutch pulleys 62 and 64 are internally splined so as to oppositely rotate the driving components 86 of multi-plate friction clutches 88 and 90. The driven components 92 of the clutch sets are connected by splining to a sleeve 94 fixed by means of a pin 99 (Figure 8) to the worm 96 which turns in roller bearings 97 and carries a conventional ball nut 98 mating with a gear sector 100, preferably integral with the cross shaft 102 and the pitman arm 104 through which the steering linkage, not shown, is actuated, (Figure 1). Sleeve 94 receives in telescoping relation the end of the steering shaft 34, which within the sleeve turns in needle bearings 106. Shaft 34 is formed to provide a portion 108 of enlarged diameter having fixed therein a clutch actuating pin 110. This pin carries a plurality of wafers or rings 112, held on the pin by snap rings 114 seating in annular grooves formed near the ends of the pin. The wafers nearest the enlarged portion 108 are disposed within helical slots 116 (Figure 7) formed in the sleeve 94, while the outermost wafers lie between a pair of thrust collars 118, 120, splined to the sleeve and forming parts of the multi-disc clutch units. Such units are adjusted to provide the proper face to face clearance between the individual components by turning the adjustor plates 122. With the proper adjustment made, the plates are automatically secured by lock springs 124.

An auxiliary sleeve 126 to the right (Figure 3) of the enlarged portion 108 of the steering shaft represents essentially an extension of the sleeve 94 and is externally grooved (125, Figure 8) to seat a plurality of snap rings 128 each of which is bent at one end to provide stops or anchoring pins 132. The latter pass through apertures in the sleeve 126 and co-act with a double torsion spring 130, surrounding the steering shaft 34, to set up a resistance required to be overcome before the shaft can be rotated relative to the sleeve 94 and the worm 96 as permitted by the pin and slot connection (110, 116). The magnitude of the resistance is preferably such that a force of from two to eight pounds must be applied at the rim of the steering wheel 36 to overcome it. This provides in some measure a steering "feel," without which many individuals might conceivably experience difficulties. Considering the nature of the slots 116, it should be evident that any rotation of the shaft 34 relative to the sleeve 94 necessarily proceeds with axial movement of the shaft in a direction determined by the direction of rotation thereof.

The anchoring pins 132 are disposed within the sleeve 126 immediately adjacent pins 134 fixed in the steering shaft 34. Now assuming the resistance to the turning of the worm 96 and the sleeve 94 is such that on the manual rotation of shaft 34 to the right the same tends to turn relative to the sleeve and worm, it should be clear (Figure 8) that the shaft will tend to rotate the double torsion spring 130 with it, this by force of the intermediate pin 134, but that such rotation of the torsion spring will be resisted by the two end anchoring pins 132. Thus, the torsion spring instead of rotating with the steering shaft simply lengthens and decreases in diameter. Should the steering shaft 34 be rotated counter-clockwise relative to the worm 96 the end pins 134 rather than the middle pin 134 will tend to cause rotation of the torsion spring with the shaft, while the middle anchoring pin 132 will act to prevent such rotation.

To describe now the over-all operation of the illustrated gear, let it be taken that the vehicle is in motion with the motor running and the steering wheel is rotated clockwise to negotiate a right turn. If the steering resistance is greater than the centering force of the double torsion spring 130, i. e. the force set up by such spring in opposition to the turning of the shaft 34 relative to the worm shaft, which may be considered as constituted of the sleeve 94 and the worm proper, the steering shaft 34 will be cammed upwardly by reason of the pin and helical slot connection 110, 116, to bring about engagement of the upper multi-disc friction clutch 90 with powering of the worm shaft and the parts therebeyond including the dirigible wheels, which are steered to the right as desired.

Assuming a left-turn rotation of the steering shaft, the same is cammed downwardly rather than upwardly to effect engagement of the lower multi-disc friction clutch 88 so that the dirigible wheels are power steered to the left.

When the steering resistance is less than the centering force of the double torsion spring, there is no relative rotary or axial movement of the steering or control shaft 34 and hence no turning of the pin 110 in the helical slots. Thus, the clutches remain disengaged and the steering is carried out manually.

The degree of power assist to steering may be varied by varying the pre-loading of the torsion spring. Thus, it is possible to either build a unit which will give power assist for high steering load conditions (parking, abrupt turns at low speeds, blown tire, etc.) only, or to build one which will provide power assist for all load conditions.

In the event of failure in the power system, the vehicle is simply steered through the pin 110. The lost motion represented by the helical slots is not such as to give rise to any difficulties. The manual steering will necessarily involve turning of the pulleys and the connecting belt 60 within the casing 30, but due to the over-running clutch 42 no other abnormal resistance is presented.

It is to be understood that the invention is not restricted to the specific embodiment represented by the drawings. Thus, in lieu of the belt 60, which may with advantage be of fabric-reinforced rubber construction, there may be used, for example, an appropriately fashioned metal chain, in which event sprocket wheels would be substituted for the pulleys.

Having thus described and illustrated the invention, what we claim is:

1. In a follow-up mechanism, a powered member, a constantly operated power source, a pair of oppositely rotating pulleys driven from said power source by means including a flexible belt interconnecting said pulleys, clutch means arranged to operably connect one or the other of said oppositely rotating pulleys and said powered member, a control shaft, a second shaft operably connected to said powered member and in part surrounding said control shaft in co-axial telescoping relation, means associated with said shafts whereby a relative rotation of said control shaft will result in a relative axial movement thereof, the direction of the axial movement being dependent upon the direction of the relative rotation, and means for causing engagement of one or the other of said clutch means as determined by the direction of said relative rotation, said means being brought into play by the said relative axial movement.

2. A follow-up mechanism conforming to claim 1 which includes spring means associated with said shafts and operating in opposition to the relative rotation.

3. A follow-up mechanism conforming to claim 1 further characterized in the inter-positioning of an over-running clutch mediate said power source and said pulleys.

4. In an assemblage for the power steering of an automotive vehicle or he like, a steering arm, a worm shaft operably connected to said arm to rock the same, a pair of oppositely rotating pulleys driven from the engine of the vehicle by means including a flexible belt interconnecting said pulleys, a multi-plate friction clutch associated with each of said pulleys, the driving plates of the clutches being constantly rotated by said pulleys, the driven plates being operably connected to said worm shaft, a steering shaft in telescoping relation with said worm shaft, means associated with said shafts whereby a relative rotation of said steering shaft will result in a relative axial movement thereof, the direction of the axial movement being dependent upon the direction of the relative rotation, and means for causing engagement of one or the other of said multi-plate clutches as determined by the direction of said relative rotation, said means being brought into play by the said relative axial movement.

5. An assemblage conforming to claim 4 which includes a double torsion spring associated with said shaft and operating in opposition to the relative rotation thereby to provide a steering feel.

6. An assemblage conforming to claim 4 further characterized by the inter-positioning of a ratchet type overrunning clutch mediate the engine and said pulleys.

7. In an assemblage for the power steering of an automotive vehicle or the like, a steering arm, a worm shaft operably connected to said arm to rock the same, said shaft including a sleeve portion having a pair of oppositely rotating pulleys driven from the engine of the vehicle by means including a flexible belt interconnecting said pulleys, a multi-plate friction clutch associated with each of said pulleys, the driving plates of each clutch being constantly rotated by the corresponding pulley, the driven plates being operably connected to said worm shaft, a steering shaft terminating within the sleeve portion of said worm shaft and carrying a pin extending through the said helical slots and a centering spring associated with said shafts tending to resist rotary and axial movement of said steering shaft relative to said worm shaft as permitted by the pin and slot connection, said assemblage being characterized in operation in that when the resistance to the turning of said worm shaft exceeds the centering force of said spring the resultant axial movement of said steering shaft obtaining on the manual rotation of the same brings about engagement of one or the other of said clutches as determined by the direction of the manual rotation, the clutch engagement being effected through said pin.

8. An assemblage conforming to claim 7 further characterized in the inter-positioning of a ratchet type overrunning clutch mediate the engine and said pulleys.

9. A mechanical assemblage including a pair of shafts interconnected by means whereby one of the shafts may be rotated relative to the other within predetermined limits and means serving to provide a resistance to the relative rotation, said last-mentioned means comprising a spring element wound about the relatively rotatable shaft and having end loops and a central loop and further comprising a pair of anchoring elements in each loop, one of said pair of elements being fixedly associated with one of said shafts, the other being fixedly associated with the other of said shafts.

References Cited in the file of this patent

UNITED STATES PATENTS

| 2,216,321 | O'Brien | Oct. 1, 1940 |
| 2,311,010 | Vickers | Feb. 16, 1943 |
| 2,414,515 | Field | Jan. 21, 1947 |
| 2,614,440 | Richey | Oct. 21, 1952 |

FOREIGN PATENTS

| 377,938 | France | Sept. 19, 1907 |

UNITED STATES PATENT OFFICE
CERTIFICATE OF CORRECTION

Patent No. 2,802,371                                              August 13, 1957

Clovis W. Lincoln et al.

It is hereby certified that error appears in the printed specification of the above numbered patent requiring correction and that the said Letters Patent should read as corrected below.

Column 5, line 19, before "rotating pulleys" insert -- positioned helical slots therein, a pair of oppositely --.

Signed and sealed this 29th day of October 1957.

(SEAL)
Attest:

KARL H. AXLINE
Attesting Officer

ROBERT C. WATSON
Commissioner of Patents